(12) United States Patent
Steinmeier

(10) Patent No.: US 12,173,764 B2
(45) Date of Patent: Dec. 24, 2024

(54) BRAKE DISC PROVIDED WITH PROTECTION FROM WEAR AND CORROSION AND METHOD FOR PRODUCTION THEREOF

(71) Applicant: C4 Laser Technology GmbH, Freital (DE)

(72) Inventor: Tilo Steinmeier, Pohrsdorf (DE)

(73) Assignee: C4 Laser Technology GmbH, Freital (DE)

(*) Notice: Subject to any disclaimer, the term of this patent is extended or adjusted under 35 U.S.C. 154(b) by 265 days.

(21) Appl. No.: 17/789,241

(22) PCT Filed: Apr. 22, 2020

(86) PCT No.: PCT/EP2020/061221
§ 371 (c)(1),
(2) Date: Jun. 27, 2022

(87) PCT Pub. No.: WO2021/008744
PCT Pub. Date: Jan. 21, 2021

(65) Prior Publication Data
US 2023/0046519 A1    Feb. 16, 2023

(30) Foreign Application Priority Data

Dec. 30, 2019    (DE) .......................... 202019107269.5

(51) Int. Cl.
*F16D 65/12*      (2006.01)
*C23C 2/26*       (2006.01)
(Continued)

(52) U.S. Cl.
CPC ............ *F16D 65/127* (2013.01); *C23C 2/261* (2022.08); *C23C 2/28* (2013.01); *C23C 4/02* (2013.01);
(Continued)

(58) Field of Classification Search
CPC .. F16D 65/127; F16D 65/10; F16D 2065/132; C23C 4/02; C23C 4/08;
(Continued)

(56) References Cited

U.S. PATENT DOCUMENTS

2003/0206819 A1* 11/2003 Talia ....................... C22C 1/047
                                                       419/8
2007/0062768 A1*  3/2007 Hanna ................... B22D 19/00
                                                       188/218 XL (Continued)

FOREIGN PATENT DOCUMENTS

DE           10203507 A1     1/2003
DE        102009008114 A1    8/2010
(Continued)

*Primary Examiner* — Vishal R Sahni
(74) *Attorney, Agent, or Firm* — Michael Soderman

(57) ABSTRACT

The present invention concerns the field of vehicle technology and industrial-plant technology and relates to a brake disc provided with protection from wear and corrosion and to a method for production thereof. The known solutions have the disadvantage that the coating for providing protection from corrosion and wear is applied to the frictional surfaces of the brake disc and is rubbed off straight away during the first braking operations. The present invention addresses the problem of providing a brake disc that has improved and durable protection from corrosion and wear. The significantly improved properties of the brake disc in terms of protection from corrosion and wear are achieved according to the invention by at least the region of the frictional surfaces (2) having an AlSi-based diffusion layer (3), which has a layer thickness of 0.1 mm to 0.6 mm and is formed in the process of interaction with the steel or grey cast iron of the metal main body (1). The brake disc according to the invention can be used for example in vehicles or as a braking system for industrial brakes or in wind turbines.

18 Claims, 1 Drawing Sheet

(51) Int. Cl.
  *C23C 2/28*    (2006.01)
  *C23C 4/02*    (2006.01)
  *C23C 4/08*    (2016.01)
  *C23C 4/131*   (2016.01)
  *C23C 4/18*    (2006.01)
  *F16D 65/10*   (2006.01)
  *F16D 65/02*   (2006.01)

(52) U.S. Cl.
  CPC ............... *C23C 4/08* (2013.01); *C23C 4/131* (2016.01); *C23C 4/18* (2013.01); *F16D 65/10* (2013.01); *F16D 2065/132* (2013.01); *F16D 2200/003* (2013.01); *F16D 2250/0046* (2013.01)

(58) Field of Classification Search
  CPC ........... C23C 4/131; C23C 4/18; C23C 10/00; C23C 10/02; C23C 10/48; C23C 10/50; C23C 2/12; C23C 2/261; C23C 2/28; C23C 28/021; C23C 28/028; C23C 26/00; C23C 30/00
  See application file for complete search history.

(56) References Cited

U.S. PATENT DOCUMENTS

| | | | |
|---|---|---|---|
| 2013/0112514 A1* | 5/2013 | Hanna | F16D 65/0006 188/218 XL |
| 2014/0060983 A1 | 3/2014 | Sugai et al. | |
| 2016/0025167 A1* | 1/2016 | Broda | C23C 4/18 427/292 |
| 2017/0122392 A1* | 5/2017 | Lembach | F16D 69/04 |

FOREIGN PATENT DOCUMENTS

| | | |
|---|---|---|
| DE | 102014008844 A1 | 12/2015 |
| DE | 202018102704 U1 | 5/2018 |
| DE | 202018102703 U1 | 6/2018 |
| DE | 202018107169 U1 | 1/2019 |

* cited by examiner

BRAKE DISC PROVIDED WITH PROTECTION FROM WEAR AND CORROSION AND METHOD FOR PRODUCTION THEREOF

CROSS REFERENCE TO RELATED APPLICATIONS

This application is the U.S. national stage of International Application No. PCT/EP2020/061221, filed on 2020 Apr. 22. The international application claims the priority of DE 202019107269.5 filed on 2019 Dec. 30; all applications are incorporated by reference herein in their entirety.

BACKGROUND

The present invention relates to the field of vehicle technology and of industrial plant technology, and relates to a brake disk having protection from wear and corrosion, and to a process for production thereof. The brake disk produced in accordance with the invention may be used, for example, in vehicles or as a brake system for industrial brakes or in wind turbines.

Conventional brake disks in vehicles and in industrial applications are either designed as a brake disk in one-piece form made from a metallic or ceramic material or as a composite brake disk or multipart brake disk composed of one or more metallic or ceramic materials.

Brake disks have multiple functional regions. For instance, brake disks in motor vehicles are screwed onto the front and rear axles and, for this purpose, have a planar contact surface which is in contact firstly with the wheel rim and secondly with the wheel bearing. The entire brake disk is connected via the contact surface by means of wheel bolts.

In addition, brake disks have regions with friction surfaces via which the braking action is implemented in association with rubbing brake linings.

For better dissipation of the heat that arises, the brake disks may take the form, for example, of internally ventilated disk brakes. For this purpose, they have corresponding ventilation ducts on the inside of the brake disk hat which suck in air, which flow through brake disk, dissipate heat and hence ensure the cooling of the brake disk.

Brake disks in the prior art are provided either with short-term protection from corrosion in the region of the friction surfaces or with long-term protection from corrosion in the region of the ventilation ducts. Short-term protection from corrosion protects the brake disk from corrosion only for a short period of time.

The prior art discloses various solutions for protecting brake disks from corrosion and wear.

DE 20 2018 107 169 U1 discloses a coating, especially for brake disks, brake drums and clutch plates, having a first layer comprising a metal-based material containing less than 20% by weight of tungsten carbide or other carbides, and a second layer which is applied to the first layer and comprises a tungsten carbide-containing material that contains 20% by weight to 94% by weight of tungsten carbide, wherein the first layer and the second layer are thermally sprayed layers.

DE 20 2018 102 703 U1 discloses a brake body for a vehicle, having a main body that has a surface formed by roughening as friction surface and a coating applied to the friction surface by means of a thermal spraying method after roughening.

Also known from DE 20 2018 102 704 U1 is a brake body for a vehicle, having a main body having a first surface in the form of a friction surface, a second surface in the form of a main surface adjacent to the friction surface, and a main surface coating applied to the main surface.

Additionally known from DE 102 03 507 A1 is a brake disk for a vehicle, comprising a main body made of a metallic material, especially gray iron, having at least one friction surface with a coating of a hard material, wherein the main body beneath the coating has a removed material thickness in the direction axially parallel to the axis of the brake disk, wherein the main body has a removed material thickness in the direction axially parallel to the axis of the brake disk of about the layer thickness of the coating, or up to +/−20% more or less, preferably +/−10%, based on the layer thickness of the coating.

A disadvantage of the known solutions is that the anticorrosion and antiwear coating is applied to the surface of the friction surfaces of the brake disk and is rubbed off immediately in the first braking operations, such that the friction surfaces corrode after a short time and the corrosion processes damage the base material directly. Specifically in the case of electrical vehicles or hybrid vehicles, for example, a greatly reduced number of braking operations with a cleaning effect is to be expected, which causes an elevated onset of corrosion, inevitably resulting in malfunctions. These malfunctions are manifested as noise problems and in the extreme case can lead to loss of braking performance. Moreover, a further disadvantage is that the corrosion that occurs can cause faster wear to the friction surfaces in the region of the friction surfaces.

Another disadvantage is the high material and production costs of hard material-coated brake disks with layer systems based on carbides, for example tungsten carbide, chromium carbide or boron carbide.

SUMMARY

It is an object of the present invention to provide a brake disk having improved and sustained protection from corrosion and wear.

The object is achieved by the invention specified in the patent claims. Advantageous configurations are the subject of the subsidiary claims, and the invention also includes combinations of the individual dependent patent claims in the sense of an "and" linkage, provided that they are not mutually exclusive.

The object of the invention is achieved by a brake disk having a main metallic body made of steel or gray iron, having at least one region with formed friction surfaces and at least one region with a formed contact surface for securing of the brake disk, wherein a diffusion layer formed from iron, aluminum and silicon present within the main metallic body at least in the region of the friction surfaces has a layer thickness of 0.1 mm to 0.6 mm and is formed collectively with the steel or gray iron of the main metallic body via diffusion processes.

The brake disk is advantageously one in which there are additionally ventilation ducts.

DETAILED DESCRIPTION

In an advantageous configuration, the diffusion layer takes the form of a gradated layer system composed of iron and aluminum in the layer thickness, wherein silicon is distributed homogeneously in the gradated layer system, wherein the gradated layer system is particularly advantageously formed in such a way that the proportion of iron decreases continuously toward the layer surface and the proportion of aluminum increases continuously toward the layer surface.

It is advantageous when the at least one diffusion layer is formed by coating of the main metallic body with an $AlSi_{12}$ and/or $AlSi_6$ alloy, followed by thermal treatment.

It is likewise advantageous when the region of the contact surface and/or the ventilation ducts additionally have the diffusion layer.

It is also advantageous when the diffusion layer has a greater hardness compared to the hardness of the material of the main metallic body.

In an advantageous execution of the brake disk, the diffusion layer is formed by means of a thermal treatment at 250° C. to 650° C. and with a treatment duration of 40 to 300 minutes.

Advantageously, the ventilation ducts have the diffusion layer and an Al-based surface layer having a layer thickness of 0.01 mm-0.4 mm.

It is also advantageous when coloring substances are present at least within the diffusion layer.

The invention is also achieved by a process for producing the brake disk of the invention, in which the surface of the main metallic body is mechanically processed at least in the region of the formed friction surfaces, then an AlSi-based alloy is disposed at least in the region of the formed friction surfaces by means of a coating process, then a thermal treatment of the brake disk is conducted under protective gas atmosphere, and finally the surface of the main metallic body is mechanically processed at least in the region of the friction surfaces.

Advantageously, the contact surface and/or the ventilation ducts are additionally coated with an AlSi-based alloy.

It is also advantageous when the coating is implemented with an $AlSi_{12}$ or $AlSi_6$ alloy.

In an advantageous configuration of the process, the mechanical processing and/or the coating process is performed under a protective gas atmosphere.

In a further advantageous configuration of the process, the thermal treatment of the brake disk is conducted for a treatment duration of 40 to 300 minutes and at a temperature of 250° C. to 650° C., particularly advantageously at a temperature of 550° C. to 600° C.

The process as claimed in at least one of the preceding claims 11 to 15, in which the brake disk is preheated prior to the coating to a temperature of 250° C. to 650° C. under a protective gas atmosphere.

In addition, in an advantageous configuration of the process, the brake disk is preheated prior to the coating to a temperature of 150° C. to 200° C. without a protective gas atmosphere.

And also advantageously, the coating is implemented by means of arc wire spraying, modified arc wire spraying with increased kinetic energy of the splat, high-velocity wire flame spraying, liquid aluminum dipping, paint dipping, paint spraying, laser powder buildup welding, powder spraying or electrocoating.

It is additionally advantageous when coating with a paint is followed by implementation of a first inductive heating of the brake disk to a temperature of 250° C. to 650° C. over a period of 5 to 240 seconds.

And also advantageously, coloring substances are fed in before or during the coating, and these are used to create color markings within the diffusion layer (3) at least in the region of the friction surfaces (2).

The present invention has succeeded for the first time in providing a brake disk having improved anticorrosion and antiwear properties, which has been produced without any additional layer on the main metallic body. The improved anticorrosion and antiwear properties are achieved at least in the region of the friction surfaces, and the region of the contact surface and/or the ventilation ducts may also have the inventive protection from wear and corrosion.

In the context of the invention, a brake disk shall be understood to mean a component of a braking system that consists of a main metallic body and different functionalized regions such as friction surfaces in a diametric arrangement, a contact surface and ventilation ducts formed by lands.

A main metallic body in the context of the invention shall be understood to mean the formed brake disk with the functionalized regions, produced in accordance with the invention from steel or gray iron.

Friction surfaces in the context of the invention shall be understood to mean disk-like surfaces in one- or two-part form, via which the braking action is achieved in association with appropriately formed brake linings.

A contact surface in the context of the invention shall be understood to mean the region of the main metallic body which is in contact with a rim of a wheel and/or with a wheel bearing or a shaft, and is generally cohesively bonded thereto.

Ventilation ducts in the context of the invention shall be understood to mean regions of the main metallic body that are formed between two friction surfaces and have the effect of discharging heat from the brake disk and hence cooling the brake disk. The ventilation ducts are formed by lands that connect the diametrically opposite regions of the friction surfaces. The ventilation ducts may also be formed as holes or slots in the friction surfaces.

The significantly improved anticorrosion and antiwear properties of the brake disk are achieved in accordance with the invention in that at least the region of the friction surfaces has an AlSi-based diffusion layer having a layer thickness of 0.1 mm to 0.6 mm and is formed in association with the steel or gray iron of the main metallic body.

It has been found that, in the coating of brake disks, the formation of iron oxides is disadvantageous for the formation of protection from corrosion and wear, since the iron oxides formed on the metallic main body surface provide worsened adhesion conditions, which firstly hinder or prevent the formation of iron aluminides and additionally trigger brittle flaking of the antiwear and anticorrosion layer.

In order to prevent this, what is suggested in accordance with the invention is to mechanically process the main metallic body in a first process step at least in the region of the friction surfaces prior to the coating with the AlSi-based alloy, and it is advantageously proposed that the mechanical processing be conducted by two sandblasting operations in and counter to the direction of rotation with corundum at a blasting angle of about 45°. This establishes an increased surface area at least in the region of the friction surfaces, which enable improved adhesion and diffusion conditions for the antiwear and anticorrosion layer to be created.

It is particularly advantageous when the mechanical processing of the metallic main body material is effected under a protective gas atmosphere in order to prevent the immediate formation of iron oxides during and after the mechanical processing of the surface. The protective gas used may, by way of example, be argon or nitrogen. It is particularly advantageously additionally proposed that all process steps be conducted under a protective gas atmosphere in order to prevent any oxidation processes that are disadvantageous for desired growth of the diffusion layer of the invention and the desired layer thickness of 0.1 mm to 0.6 mm.

What is proposed in accordance with the invention is that the mechanical processing of the surface of the main metallic body is followed by application of an AlSi-based alloy to the material of the main metallic body at least in the region of the friction surfaces. Advantageously, the main metallic body can likewise be coated with the AlSi-based alloy under a protective gas atmosphere, in order also to counter the formation of iron oxides.

The employment of a thermal coating process makes it possible to create a particularly fine-grain AlSi-based layer having good adhesion at least in the region of the friction surfaces, in order subsequently to be able to implement the diffusion layer of the invention in the material of the main metallic body by means of a thermal treatment.

It has been found in accordance with the invention that an AlSi-based alloy composition as coating material achieves a particularly advantageous protection from wear and corrosion, which is created by the thermal treatment of the invention at a temperature of 250° C.-650° C., preferably at 550° C. to 600° C., for a treatment time of 40 to 300 minutes through diffusion within the material of the main metallic body, and which is surprisingly also maintained in a sustained manner in repeated braking operations.

The effect of the advantageous temperature range from 550° C. to 600° C. is that the diffusion rate in the creation of the diffusion layer is increased and, at the same time, the material applied is kept below the melting point. Flow of the AlSi-based alloy applied away from the main metallic body is avoided.

It is particularly advantageous for the triggering of the diffusion processes when the brake disk, prior to the coating, is preheated to a temperature of 250° C. to 650° C. under a protective gas atmosphere. It has been found that unwanted iron oxides formed at a temperature above 200° C. in the course of preheating are prevented by the use of a protective gas atmosphere.

It is surprisingly possible to avoid the use of protective gas in the preheating of the brake disk when the preheating temperature is set only at 150° C. to 200° C.

According to the invention, however, the diffusion layer grown from iron, aluminum and silicon is not, as known from the prior art, an antiwear and anticorrosion layer disposed on the surface of the main metallic body. Instead, at least in the region of the friction surfaces, the protection from wear and corrosion is provided exclusively by a pure diffusion layer formed by controlled thermal treatment of the AlSi-based alloy coated on the main metallic body by diffusion processes.

According to the invention, it has been found that, surprisingly, the proportion of silicon as alloy constituent during the thermal treatment results in deposition of homogeneous silicon crystals in the diffusion layer, which lead to a particularly homogeneous and hard diffusion layer in association with the aluminum. The proportion of silicon found in the AlSi-based alloy has the further advantage that oxygen is bound in a particularly advantageous manner and hence oxidation processes with the material of the main metallic body through formation of iron oxides are prevented. Prevention of iron oxide formation enables undisrupted and rapid growth of iron aluminides in the material of the main body with a layer thickness of 0.1 mm to 0.6 mm.

In addition, it has been found that the proposed proportion of silicon prevents unwanted oxidation of the aluminum in the near-surface region of the friction surfaces. This reduces the level of oxygen intercalated in the diffusion layer, which could prevent effective growth of the desired iron aluminides, in the AlSi-based alloy via the proportion of silicon used.

It is important for the quality of the layer created later on by diffusion that the AlSi-based layer applied has maximum intrinsic imperviosity and gives good wetting of the surface of the main metallic body. For this purpose, it is advantageous when melt droplets (splats) of the AlSi-based alloy to be applied hit the surface of the main metallic body with high kinetic energy. This is especially achieved via the coating methods of arc wire spraying, modified arc wire spraying with increased kinetic energy of the splat, high-velocity flame spraying (HVOF) or high-velocity wire flame spraying.

The thermally initiated diffusion processes result in a diffusion layer formed from iron aluminides with a significantly higher surface hardness. Material customarily used for the main metallic body is steel or gray iron having a surface hardness of about 220 HV.

The diffusion of the AlSi-based alloy into the material of the main metallic body surprisingly results in a significantly higher surface hardness of 350 HV to 850 HV at least on the mechanically aftertreated friction surfaces. The hardness ascertained was found here over the entire diffusion zone. The particular technical effect of the hardness found in the diffusion layer is that reduced abrasion of the brake disk is achieved, which has a positive effect on the service life of the brake disk and additionally significantly reduces the emission of fine dust.

A further advantage of the diffusion layer formed is that there is no need for promotion of adhesion between a main metallic body and a wear or corrosion layer applied thereto, since the AlSi-based alloy is coated directly onto the material of the main metallic body, where it grows on directly through the thermally initiated diffusion processes as iron aluminides via intermetallic processes with the material of the main metallic body. Flaking or detachment of the antiwear and anticorrosion layer from the surface of the main metallic body is thus prevented.

The diffusion layer and the interaction of brake lining, brake disk and brake caliper additionally result in a positive shift in damping factors and intrinsic frequencies. The improved function properties are actively achieved in the brake disk via the diffusion depth and hardness. Intrinsic frequencies and damping factors are reduced, and hence what is referred to among specialists as rubbing and the occurrence of brake disk noise are at least reduced in braking operations.

A particularly advantageous process for the coating of the main metallic body with the AlSi-based alloy has been found to be arc wire spraying, dipping, paint spraying, laser powder buildup welding or powder spraying, especially also when the application of the AlSi-based alloy is preceded by heating of the main metallic body. The prior heating of the main metallic body results in faster initiation of the diffusion processes and promotes growth of the iron aluminides within the main metallic body.

The final mechanical processing of the surface in the region of the friction surfaces and the contact surface after the thermal treatment achieves the technical effect that the excess Al-based surface layer is eliminated and, by contrast with known gas-nitrided brake disks, the brake disk of the invention can be used both with NAO (non-asbestos organic) brake linings and with low-met (low-metallic) brake linings.

The final mechanical processing can additionally correct any possible warpage of the brake disk in a simple manner without eliminating the improved wear and corrosion properties. Moreover, the final mechanical processing achieves the effect that an additional operation for elimination of imbalances can be dispensed with.

The novel brake disk eliminates very significant disadvantages of the brake disks currently on the market. For instance, it is known that the height of the brake lining is less than the height of the friction surface of the brake disk.

Known brake disks are therefore provided with a chamfer that runs around the outer circumference of the friction surfaces, in order to prevent the brake lining from running into the friction surface and any subsequent resultant difficulty and inconvenience in deinstalling the friction linings from the brake unit. However, the formation of a chamfer at the outer circumference of the friction surfaces is associated with an additional operation in the production of the friction surfaces and hence additional manufacturing costs.

The brake disk of the invention that has the inventive AlSi-based diffusion layer formed from iron alum inides at least in the region of the friction surfaces eliminates this disadvantage since the particular hardness of 350 HV to 850 HV prevents the brake linings from running into the friction surfaces.

In an advantageous execution of the invention, in the brake disk, not only the friction surfaces but also the region of the contact surface and the ventilation ducts may be provided with the AlSi-based alloy of the invention and the diffusion layer of the invention may be formed.

The establishment of protection from wear and corrosion in the region of the contact surface offers the technical advantage that in the case of a brake disk, for example, there is a distinct reduction in settling characteristics in cohesive bonding to the axle of a vehicle. This prevents slipping of the brake disk before it comes into contact with the wheel bolts.

The effect of the establishment of protection from wear and corrosion in the region of the ventilation ducts is that the smooth surface of the ventilation ducts, on account of the low tendency to corrosion, especially also in contact with salt solutions in winter conditions, is maintained, and sustained frictionless flow through the ventilation ducts and hence constantly good removal of heat in braking operations is enabled.

The thermally initiated diffusion of the AlSi-based alloy into the cast material or steel material in the case of the connecting lands formed for the ventilation ducts makes it possible for the first time for the connecting lands to have a smaller wall thickness. It is known that the connecting lands known to date from the prior art, taking account of the lack of corrosion protection and hence the associated increase in wear, must have a minimum wall thickness of 5 mm.

The inventive protection from wear and corrosion in the region of the ventilation ducts enables a significant reduction in the minimum geometry by about 40% to 50%, as a result of which a weight-optimized and less costly brake disk is provided for the first time.

It is conceivable that exclusively the local regions of the brake disk coated with the AlSi-based alloy of the invention are subjected to specific thermal treatment. This achieves the effect that diffusion processes are activated and hence the brake disk is specifically functionalized exclusively in these regions. For instance, it is possible that specific thermal treatment is implemented solely in the region of the material of the main metallic body in which improved protection from wear and corrosion is to be achieved. Complete thermal treatment of the entire brake disk is thus unnecessary, which makes the production of the brake disk of the invention less costly and more time-efficient.

In a particularly advantageous configuration of the brake disk and of the production process, coloring substances are supplied before or during the coating, with which color markings are created within the diffusion layer. This achieves the effect that, particularly in the region of the friction surfaces in the diffusion layer, color shadows are created, which can be used, for example, as wear indicator. But it is also possible that the coloring substances are temperature indicators and give information about the operating temperature of the brake disk, for example of the friction surfaces.

BRIEF DESCRIPTION OF THE DRAWINGS

The invention is to be elucidated in detail hereinafter by a working example. The figures show.

DETAILED DESCRIPTION OF THE PREFERRED EMBODIMENTS

Figure 1:
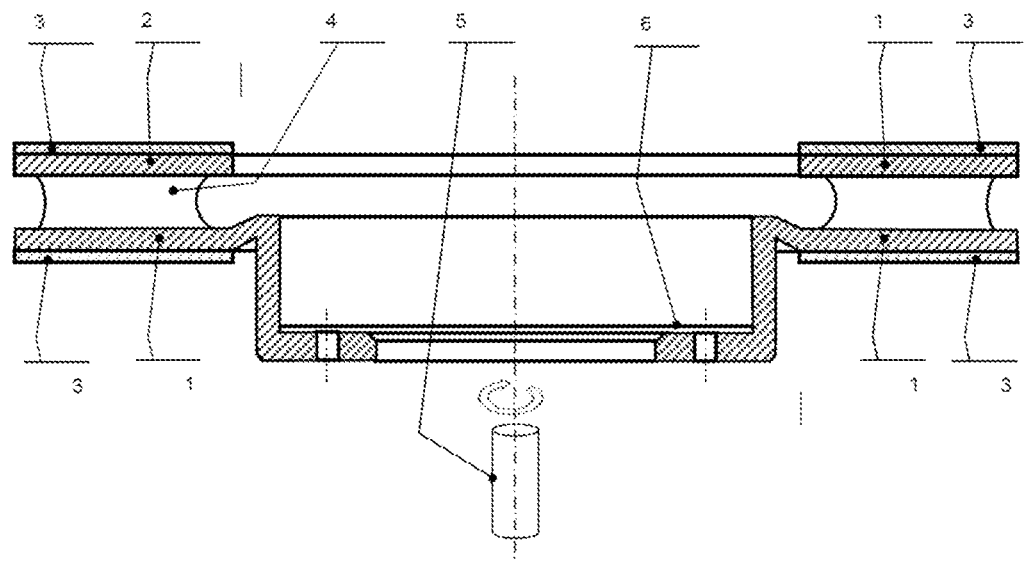
FIG. 1—schematic view of a cross section through a brake disk.
Figure 2:
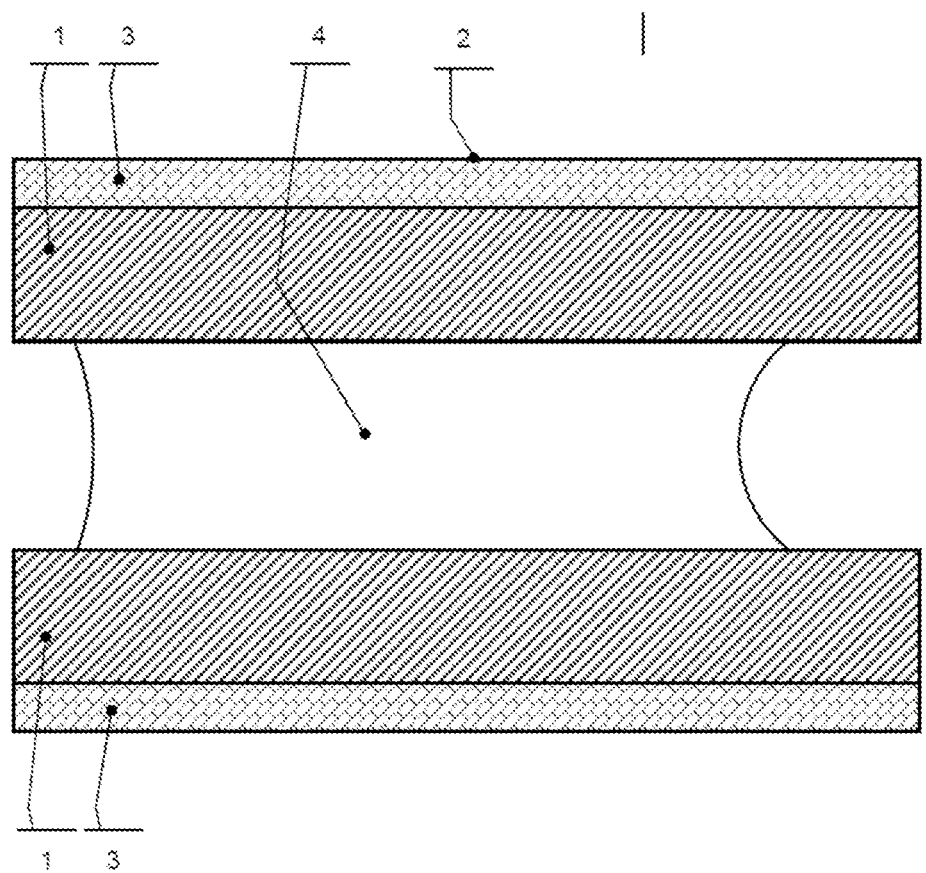
FIG. 2—schematic partial view of the brake disk with diffusion layer.

An internally ventilated brake disk for a vehicle, made from gray iron, is provided, having a hardness of 220 HV. The brake disk has two friction surfaces 2 arranged diametrically opposite one another, and a contact surface 6 for the securing of the brake disk to an axle. The two friction surfaces 2 are connected by ventilation ducts 4 in the form of lands. By means of corundum (99.81% $Al_2O_3$, 0.1% $Na_2O$, 0.04% $TiO_2$, 0.02% $SiO_2$, 0.03% $Fe_2O_3$) and using a protective nitrogen gas atmosphere, the surface of the two friction surfaces 2 is mechanically processed twice in and opposite the direction of rotation of the brake disk at an angle of 45°, and hence soiling and iron oxides are removed, in order to provide improved diffusion conditions for subsequent formation of the diffusion layer. In addition, the lamellar structure of the gray iron is modified and eliminated in the near-surface region.

Subsequently, the brake disk is sent to a coating plant and coated under a protective nitrogen gas atmosphere by means of arc wire spraying with an $AlSi_{12}$ alloy having a layer thickness of 0.4 mm in the region of the friction surfaces 2, the contact surface 6 and the ventilation ducts 4. After the coating, a thermal treatment of the entire brake disk is undertaken in an oven under a protective argon gas atmosphere. The thermal treatment is conducted at 580° C. for 240 minutes, and then the brake disk is cooled. The thermal treatment formed a diffusion layer 3 of iron aluminides having a layer thickness of 170 μm to 200 μm, and an Al-based surface layer having a layer thickness of about 50 μm.

The excess Al-based surface layer is then mechanically processed by means of grinding in the region of the friction surfaces 2 and the contact surface 6 and removed down to the diffusion layer 3, such that exclusively the diffusion layer 3 composed of grown iron aluminides remains in the region of the friction surfaces 2 and the contact surface 6. Silicon is distributed homogeneously in the diffusion layer. There is no mechanical processing of the surfaces in the region of the ventilation ducts 4.

The friction surfaces 2, contact surface 6 and the ventilation ducts 4 have a hardness of 350 HV and have long-term protection from wear and corrosion.

LIST OF REFERENCE NUMERALS

1—main metallic body
2—friction surface

3—diffusion layer
4—ventilation ducts
5—rotating axle
6—contact surface

The invention claimed is:

1. A brake disk having a main metallic body (1) made of steel or gray iron, having at least one region with formed friction surfaces (2) and at least one region with a formed contact surface (6) for securing of the brake disk, wherein a diffusion layer (3) formed from iron, aluminum and silicon present within the main metallic body (1) at least in the region of the friction surfaces (2) has a layer thickness of 0.1 mm to 0.6 mm and is formed collectively with the steel or gray iron of the main metallic body (1) via diffusion processes, and in which the diffusion layer (3) is graded from iron and aluminum, and in which the gradated diffusion layer (3) is formed in such a way that the proportion of iron decreases continuously related toward the friction surface (2) of the gradated diffusion layer (3) and the proportion of aluminum increases continuously related toward the friction surface (2) of the gradated diffusion layer (3), wherein silicon is distributed homogeneously in the gradated diffusion layer (3).

2. The brake disk as claimed in claim 1, in which ventilation ducts are additionally present.

3. The brake disk as claimed in claim 1, in which the at least one diffusion layer (3) is formed by coating the main metallic body (1) with an $AlSi_{12}$ and/or $AlSi_6$ alloy, followed by thermal treatment.

4. The brake disk as claimed in claim 1, in which the region of the contact surface (6) and/or the ventilation ducts (4) additionally has the diffusion layer (3).

5. The brake disk as claimed in claim 1, in which the diffusion layer (3) has a greater hardness compared to the hardness of the material of the main metallic body (1).

6. The brake disk as claimed in claim 1, in which the diffusion layer (3) is formed by means of a thermal treatment at 250° C. to 650° C. and a treatment duration of 40 to 300 minutes.

7. The brake disk as claimed in claim 1, in which the ventilation ducts (4) have the diffusion layer (3) and an Al-based surface layer having a layer thickness of 0.01 mm-0.4 mm.

8. The brake disk as claimed in claim 1, in which coloring substances are present at least within the diffusion layer (3).

9. A process for producing the brake disk as claimed in claim 1, in which the surface of the main metallic body (1) is mechanically processed at least in the region of the formed friction surfaces (2), then an AlSi-based alloy is disposed at least in the region of the formed friction surfaces (2) by means of a coating process, then a thermal treatment of the brake disk is conducted under protective gas atmosphere, and finally the surface of the main metallic body (1) is mechanically processed at least in the region of the friction surfaces (2).

10. The process as claimed in claim 9, in which the contact surface (6) and/or the ventilation ducts (4) are additionally coated with an AlSi-based alloy.

11. The process as claimed in claim 9, in which the coating is implemented with an $AlSi_{12}$ or $AlSi_6$ alloy.

12. The process as claimed in claim 9, in which the mechanical treatment and/or the coating method is conducted under a protective gas atmosphere.

13. The process as claimed in claim 9, in which the thermal treatment of the brake disk is conducted for a treatment duration of 40 to 300 minutes and at a temperature of 250° C. to 650° C., particularly advantageously at a temperature of 550° C. to 600° C.

14. The process as claimed in claim 9, in which the brake disk is preheated prior to the coating to a temperature of 250° C. to 650° C. under a protective gas atmosphere.

15. The process as claimed in claim 9, in which the brake disk is preheated prior to the coating to a temperature of 150° C. to 200° C. without a protective gas atmosphere.

16. The process as claimed in claim 9, in which the coating is implemented by means of arc wire spraying, modified arc wire spraying with increased kinetic energy of the splat, high-velocity wire flame spraying, liquid aluminum dipping, paint dipping, paint spraying, laser powder buildup welding, powder spraying or electrocoating.

17. The process as claimed in claim 16, in which coating with a paint is followed by implementation of a first inductive heating of the brake disk to a temperature of 250° C. to 650° C. over a period of 5 to 240 seconds.

18. The process as claimed in claim 9, in which coloring substances are fed in before or during the coating, and these are used to create color markings within the diffusion layer (3) at least in the region of the friction surfaces (2).

* * * * *